May 19, 1936.     I. H. NOELL ET AL     2,041,616
MOBILE GROUND WORKING DEVICE
Filed Sept. 3, 1935
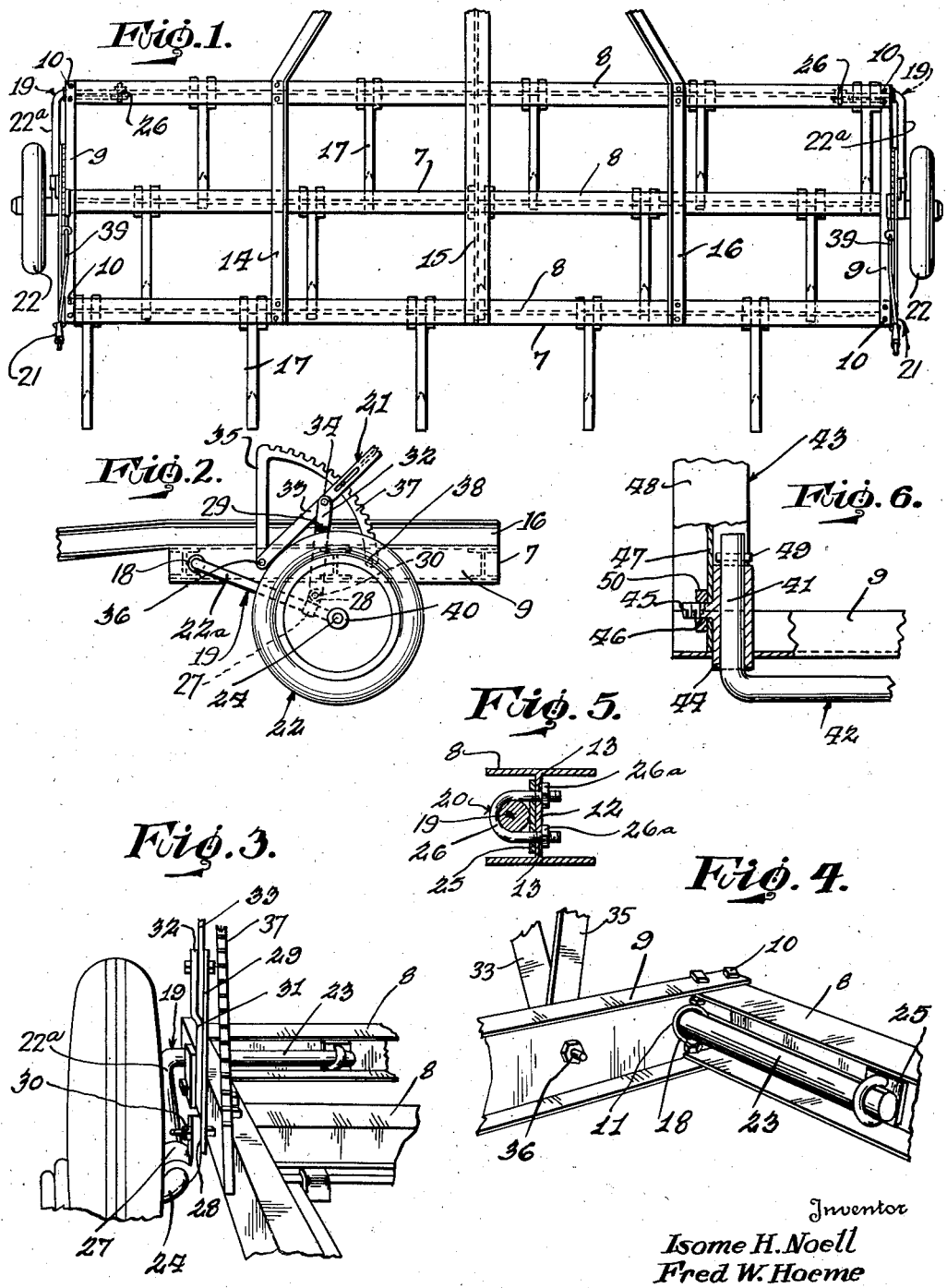
Inventor
Isome H. Noell
Fred W. Hoeme
By Geo. P. Kimmel
Attorney Patented May 19, 1936

2,041,616

UNITED STATES PATENT OFFICE 2,041,616

MOBILE GROUND WORKING DEVICE

Isome H. Noell and Fred W. Hoeme, Hooker, Okla.

Application September 3, 1935, Serial No. 39,052

3 Claims. (Cl. 280—6)

This invention relates to a mobile ground working device, such as a shovel, plow or cultivator, more particularly to a combined adjustable suspension and traction means for each side of the body-part or frame of the device and is a continuation in part of our application filed June 1, 1935, Serial Number 24,553, now Patent No. 2,029,249, dated Jan. 28, 1936.

The invention has for its object to provide, in a manner as hereinafter set forth, an adjustable suspension and traction structure for each side of the body-part or frame of a mobile ground working device including traction elements carried by suspensions and with the latter capable of being adjusted for elevating and lowering the said body-part or frame relative to the ground, and with said suspensions connected to and within said body part and extended outwardly and depending from the sides of the latter.

A further object of the invention is to provide, in a manner as hereinafter set forth, a suspension means for the purpose referred to and with the traction elements carried by said means being of the cushioned type.

A further object of the invention is to provide, in a manner as hereinafter set forth, a mobile ground working device of that type including a skeleton body-part or frame carrying ground working tools and with the device, at its sides, having vertically adjustable combined suspension and traction means therefor capable of being adjusted for the purpose of elevating and lowering the body-part or frame of the device relative to the ground, as well as providing a cushioned support for the device especially when the latter is traveling and acting on the ground.

Further objects of the invention are to provide, in a manner as hereinafter set forth, a vertically adjustable combined cushioned suspension support and traction means for the purpose referred to which is simple in its construction and arrangement, strong, durable, compact, conveniently installed with respect to the sides of the body-part or frame of a mobile ground working device, readily adjusted when occasion requires, and inexpensive to manufacture.

With the foregoing and other objects which may hereinafter appear, this invention consists of such parts and such combination of parts, as will be more specifically referred to and are as illustrated in the accompanying drawing wherein is shown embodiments of the invention, but it is to be understood that changes, variations and modifications may be resorted to which fall within the scope of the invention as claimed.

In the drawing:

Figure 1 is a top plan view of a mobile ground working device showing the vertically adjustable suspending, supporting and traction structures, in accordance with this invention, as attached to the sides of the body part or frame of the device, Figure 2 is a fragmentary view in side elevation of the ground working device illustrating one of the vertically adjustable suspending, supporting and traction structures, Figure 3 is a fragmentary detail in perspective showing the manner in which the upper arm of the hanger element of each structure is connected to the body-part or frame of the ground working device, Figure 4 is a fragmentary view in perspective of and looking towards the inner face of a pair of irons of the body-part or frame of the ground working device showing the mounting therewith of the upper arm of a hanger employed in each of the structures.

Figure 5 is a sectional detail illustrating the manner of connecting a hanger to the body part or frame of the ground working device, and Figure 6 is a fragmentary view partly in section illustrating a modification of the cushioned combined suspending, supporting and traction structure.

With reference to Figures 1 to 5 of the drawing, the ground working device is shown as including a horizontally disposed rectangular body part or frame 7 hereinafter termed a skeleton body. The latter is formed of a set of spaced parallel I-beams 8 arranged tandemwise and a pair of oppositely disposed inwardly opening channel irons 9 which overlap the ends of the I-beams and are fixedly secured to these latter by the hold-fast means 10. The beams and irons coact to provide a rectangular skeleton body or frame. Each channel iron, in proximity to its forward end, is formed with an opening 11. The web 12 of the forward I-beam of the set adjacent each end thereof is formed with a pair of superposed openings 13. The body 7 has secured thereon spaced reinforcing means as indicated at 14, 15 and 16 and which constitute a draw-bar provided by the means 15 and a pair of braces for the draw-bar provided by the means 14, 16. The construction, arrangement, description and purpose of the means 14, 15 and 16 will be found in our co-pending applications, Serial Number 24,553, filed June 1, 1935, and Serial Number 39,053, filed September 3, 1935, now Patent No. 2,029,250, dated Jan. 28, 1936. The I-beams 8 have coupled to the base flanges thereof ground working tools 17. The construction, arrangement, manner of connecting, description and purpose of the tools 17 will be found in our co-pending application, Serial Number 24,553, filed June 1, 1935.

The body 7 is suspended, supported and vertically adjusted by a cushioned combined suspension supporting and traction structure, in accordance with this invention, arranged at and connected to each side thereof. The structure includes a bushing 18 mounted in a channel iron 9, a hanger 19, a means 20 for anchoring the hanger 19 to body 7, and adjusting mechanism 21, for the hanger and a traction wheel 22 of the pneumatic type carried by the hanger 19. The bushing 18 is anchored in an opening 11. The hanger 19 is of angle form and includes an intermediate part 22ᵃ and a pair of oppositely extending end parts 23, 24 disposed at right angles to part 22. The parts 23, 24 extend inwardly and outwardly respectively relative to the ends of part 22ᵃ. The part 22ᵃ is passed through the bushing 18 and is disposed parallel to the inner face of the web 12 of the forward I-beam of the set. The means 20 consists of an apertured plate 25 positioned against the inner face of web 12 and a yoke 26. The latter surrounds leg 23, extends through openings 13 and carries clamping nuts 26ᵃ which abut the forward face of web 12. The adjusting mechanism 21 for the hanger 19 which provides for elevating and lowering body 7 consists of a coupling member 27 which is connected to the lower or rear portion of leg 22ᵃ and formed with an upstanding shank 28, an upstanding link 29 connected at its lower end, as at 30, to shank 28, a bar 31 secured to the outer face of link 29 and having an offset upper portion 32, a lever 33 passing between the portion 32 and link 29 and pivotally connected intermediate its ends, as at 34, to said portion 32 and link 29, a standard 35 anchored at its lower end to a channel 9, as at 36, and extending above body 7. The standard 38 merges at its upper end into a rearwardly extending downwardly curved rack 37 of quadrant shape, anchored at its lower end, as at 38, to that channel iron 9 to which the standard 35 is secured. The lever 33 is provided with the usual dog or pawl and lever mechanism 39 which associates with the rack 37 to releasably retain the hanger 19 in its adjusted position. The traction wheel 22 is revolubly mounted on the leg 24 of hanger 19 and is retained thereon by a nut or cap 40. When the leg 22ᵃ of hanger 19 is elevated or lowered the body 7 is shifted in a like manner and suspended from hanger 19 in the position to which it has been adjusted. The wheels 22 constitute a cushioned supporting means for body 7. The anchoring means 36 for standard 35 provides a pivot for the lower end of lever 33.

The structure shown in Figure 6 relates to a modification of the cushioned combined suspension, supporting and traction structure, and in this connection the upper leg 41 of the hanger 42 is connected to the skeleton body 43 of the mobile ground working device by a different means than that aforesaid. The said different means includes a sleeve 44 formed intermediate its ends with a threaded shank 45 which extends through an opening 46 formed in the web 47 of the forward I-beam 48 of body 43. The sleeve 44 extends through opening 11 in a channel iron 9. The leg 41 extends inwardly of the inner end of sleeve 44 and is provided with a stop pin 49. A clamping nut 50 is carried by shank 45 and abuts the forward face of web 47. Otherwise than that as stated the modified form of suspension, supporting and traction structure shown in Figure 6 would be the same as that shown in Figures 2 to 4.

What we claim is:

1. In a ground working device a horizontally disposed rectangular frame including a front, a rear and a pair of sides, said front being in the form of an I-beam provided with top and bottom flanges and a vertical web connecting the flanges, said frame having each of its sides formed with an opening in proximity to the inner face of said web, tubular bearings extending through said openings, a pair of wheels, a pair of oppositely disposed adjustable depending independent hangers, each of said hangers including an inwardly extending upper part, an outwardly extending lower part carrying one of said wheels and an intermediate part connecting said upper part to said lower part, said upper parts journaled in and extending through said bearings, means extending through said web for connecting said upper parts to the web, a pair of upstanding racks secured to the sides of said frame, a pair of elevating and lowering levers, each of said levers having a pawl and lever mechanism associated with a rack, said levers being pivotally connected at their lower ends with the sides of said frame, and a pair of upstanding links pivotally connected at their upper ends to said levers and pivotally connected at their lower ends to the said intermediate parts.

2. In a mobile ground working device a horizontally rectangular frame including a front, a rear and a pair of sides, said front being in the form of an I-beam provided with top and bottom flanges and a vertical web connecting the flanges, said frame having each of its sides formed with an opening in proximity to the inner face of said web, said web being formed inwardly adjacent to each of its ends with a pair of spaced openings, bearings mounted in the openings in said sides, a pair of wheels, a pair of oppositely disposed adjustable depending independent hangers, each of said hangers having an inwardly extending upper part, an outwardly directed lower part carrying one of said wheels and an intermediate part connecting said upper part to said lower part, said upper parts being journaled in and extending inwardly from said bearings, a pair of yokes, each yoke being connected to and extending through a pair of openings in the web for coupling one of said upper parts to said web, and a pair of elevating and lowering devices carried by said frame for said hangers including upstanding links pivotally connected at their lower ends to said intermediate parts and levers pivotally connected at their lower ends upon the sides of said frame and pivotally connected intermediate their ends to the upper ends of said links.

3. In a mobile grounding working device, a horizontally disposed rectangular frame including a front bar and a pair of side bars, each of said side bars being formed with an opening located in proximity to the inner face of the front bar, tubular bearings extending through said openings, a pair of wheels, a pair of oppositely disposed adjustable depending independent hangers, each of said hangers consisting of an inwardly extending upper part, an outwardly extending lower part upon which one of said wheels is mounted and an intermediate part connecting said upper part to said lower part, said upper parts extending inwardly through said bearings, means extending through said front bar for securing said upper parts with and in juxtaposition to the inner face of said front bar, upstanding links pivotally connected at their lower ends to said intermediate parts, and elevating and lower devices carried by said frame, said devices being pivotally connected to the upper ends of said links and with sides of said frame.

ISOME H. NOELL.
FRED W. HOEME.